VOLTAGE REGULATOR EMPLOYING CASCADED OPERATIONAL AMPLIFIERS

Filed April 28, 1967 2 Sheets-Sheet 1

VOLTAGE REGULATOR EMPLOYING CASCADED OPERATIONAL AMPLIFIERS

Filed April 28, 1967 2 Sheets-Sheet 2

3,470,457
Patented Sept. 30, 1969

1

3,470,457

VOLTAGE REGULATOR EMPLOYING CASCADED OPERATIONAL AMPLIFIERS

Donald L. Howlett, Houston, Tex., assignor to Texaco Inc., New York, N.Y., a corporation of Delaware Filed Apr. 28, 1967, Ser. No. 634,717
Int. Cl. G05f *1/60, 1/40;* H02m *3/08*
U.S. Cl. 323—22 9 Claims

ABSTRACT OF THE DISCLOSURE

A voltage regulator circuit employing two operational amplifiers connected in series. The second stage, or final amplifier, from which the regulated voltage output is derived, includes three feedback loops. Two of these feedback loops are coupled to the input of the first stage, or initial, amplifier while the third of these feedback loops is coupled to the input of the second stage amplifier. The first stage amplifier has one feedback loop including a Zener diode and this feedback loop couples the output voltage of the first stage amplifier to the input thereof.

Background of the invention

This invention pertains to voltage regulator circuits, generally; and, more particularly, to a voltage regulator employing operational amplifiers having a plurality of feedback loops with a Zener diode included in at least one of the feedback loops.

Summary of the invention

The main object of the invention is to provide a voltage regulator having a highly stable voltage output even though there be variations in input voltage and/or load and/or temperature.

Briefly, in accordance with one illustrative embodiment of the invention there is provided a voltage regulator comprising a first stage operational amplifier and a second stage operational amplifier, the output of the first stage amplifier being coupled to the input of the second stage amplifier. The desired regulated voltage is derived from the output of the second stage amplifier. In the aforementioned cascaded operational amplifier configuration four feedback loops are provided. The first of these feedback loops includes a Zener diode and couples the output of the first stage amplifier to the input thereof. The second feedback loop is impedance coupled between the output and input of the second stage amplifier. The third and fourth feedback loops are impedance coupled between the output of the second stage amplifier and the input of the first stage amplifier. Advantageously, the use of a Zener diode in the feedback loop of the first stage amplifier greatly reduces the effect of offset voltages. Moreover, the above described configuration uses almost 100 percent feedback to stabilize all amplifier gains as well as the constant current through the Zener diode to stabilize the voltage across the Zener diode. Hence, the output voltage derived from the second stage amplifier is highly stable even though there be variations in the power supply and/or load and/or temperature.

Other objects and advantages of the invention will be apparent from the following description when considered in conjunction with the accompanying drawings in which.

2

Figures 2, 3:
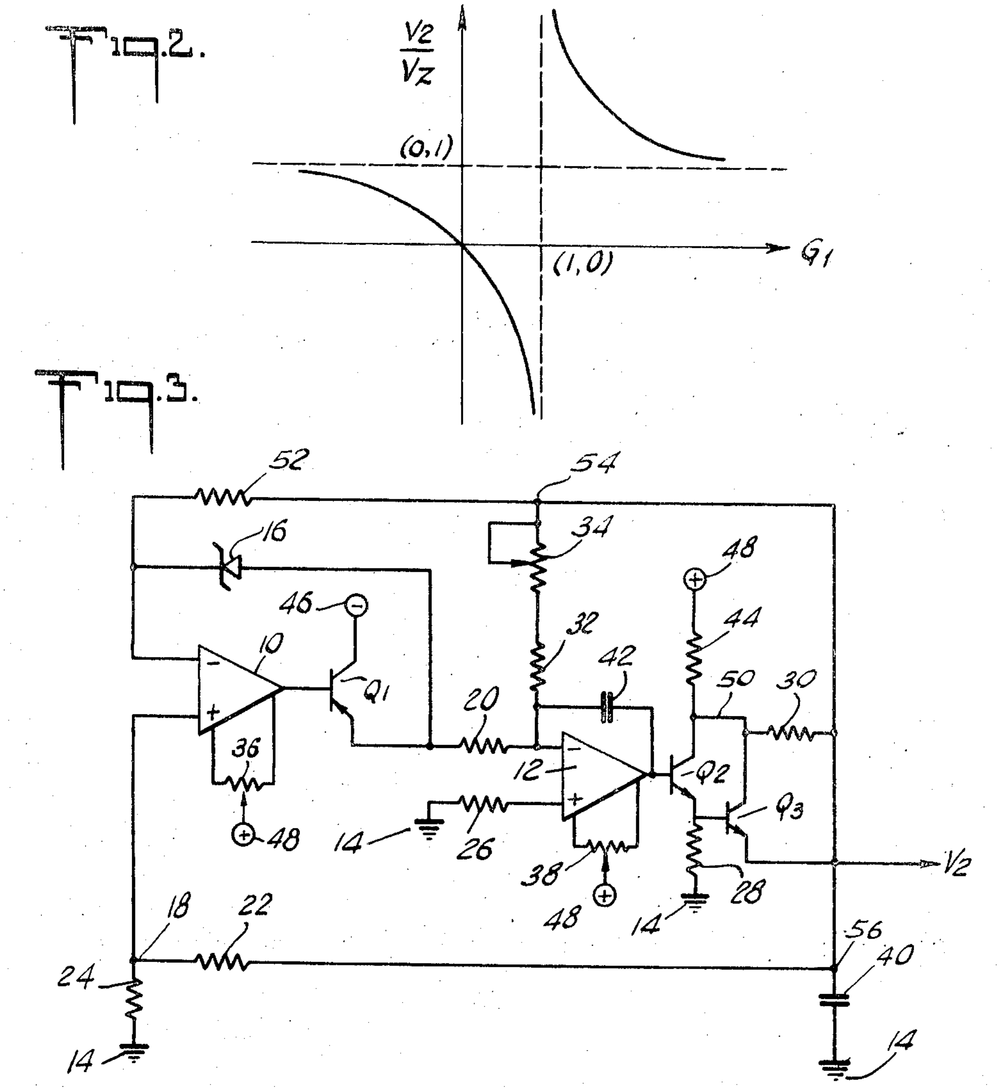
FIG. 2 is a graphical representation which will aid in the understanding of the invention.
FIG. 3 is a schematic drawing of one illustrative embodiment of the voltage regulator according to the invention.
Figure 5:
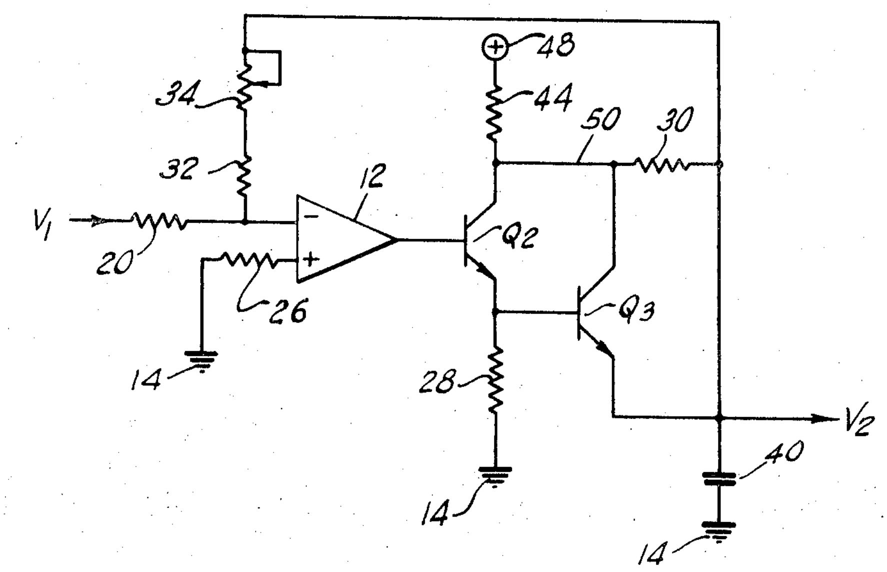

FIG. 5 is a schematic diagram of the remainder of the circuitry shown in FIG. 3 and also serves to facilitate an explantion of the operation of the voltage regulator of the invention.

Figure 1:
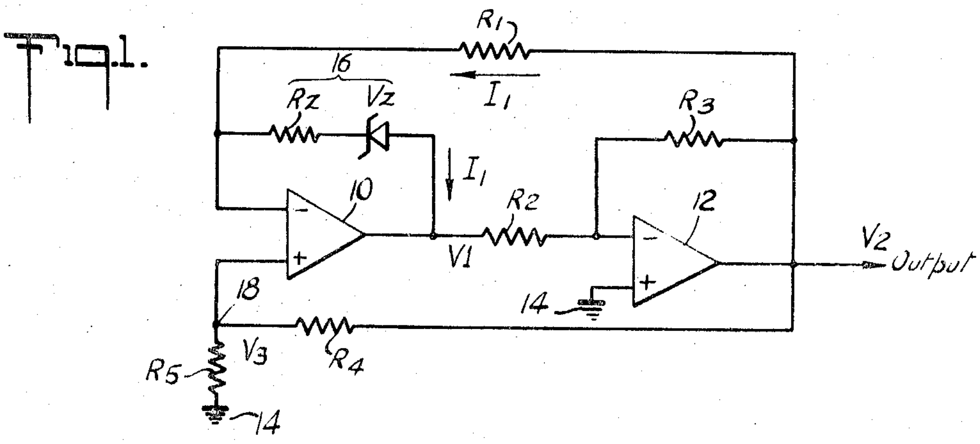
FIG. 1 is an idealized schematic drawing of the voltage regulator according to the invention.

In FIG. 1 the basic circuit configuration of the voltage regulator is shown. As will be appreciated from the discussion following, the circuit of FIG. 1 is idealized and is shown for the purpose of facilitating an understanding of the invention. As shown, two operational amplifiers 10 and 12 are provided; the former being the first stage amplifier and the latter being the second stage amplifier from which the output voltage $V_2$ is derived. The output voltage $V_1$ of the first stage amplifier 10 is coupled to the input of the second stage amplifier 12 via the resistance element $R_2$. The resistance element $R_2$ is, as indicated, coupled to the negative input terminal of the second stage amplifier 12. The positive input terminal of the amplifier 12 is connected to a common reference point or ground 14. The first stage amplifier 10 is provided with a feedback loop which connects the output of the amplifier 10 with the input thereof. This feedback loop includes a Zener diode 16 which in FIG. 1 is considered to be an ideal diode and its internal impedance is represented separately as a resistance element $Rz$ which, as shown, is connected to the negative input terminal of the first stage amplifier 10. Also, as shown, the positive input terminal of the first stage amplifier 10 is connected through the resistance element $R_5$ to a common reference point or ground 14.

The second stage amplifier 12 also has a feedback loop which connects the output of the amplifier 12 with its input. This loop is provided by a resistance element $R_3$ which is coupled between output and the negative input terminal of the amplifier 12. Two additional feedback loops are provided and they connect the output from the second stage amplifier 12 with the input to the first stage amplifier 10. As shown in FIG. 1, a resistance element $R_1$ is connected between the output of the second stage amplifier 12 and the negative input terminal of the first stage amplifier 10, thus completing one of these feedback loops. The other feedback loop is provided by connecting a resistance element $R_4$ between the output of the amplifier 12 and the junction 18, which, as shown, is connected to the positive input terminal of the first stage amplifier 10. Connected between the junction 18 and the common point or ground 14 is the resistance element $R_5$.

As indicated in FIG. 1 the voltage across the resistance elements $R_5$ is designated as $V_3$ and the voltage across the ideal Zener diode per se is designated as $Vz$.

Referring again to FIG. 1, let it be assumed that the two amplifiers have infinite gain and infinite input impedance. Then, the following mathematical relationships hold:

$$G_1=-\frac{R_3}{R_2} \qquad \text{(Equation 1)}$$

wherein $G_1$ is the gain of the second stage operational amplifier 12 expressed as the ratio of the resistance elements $R_3$ and $R_2$. Furthermore, $$G_2=\frac{R_5}{R_4+R_5} \qquad \text{(Equation 2)}$$

wherein $G_2$ is the overall gain of the cascaded amplifiers between the output of amplifier 12 and the input to the amplifier 10 including the resistance elements $R_4$ and $R_5$. Also, $$V_2=G_1V_1 \qquad \text{(Equation 3)}$$

and $$V_3=G_2V_2 \qquad \text{(Equation 4)}$$

wherein $V_1$, $V_2$ and $V_3$ are the voltages at the points shown in FIG. 1. Furthermore, the voltage across the amplifier 10 can be expressed as $$V_3-V_1=Vz+I_1Rz \qquad \text{(Equation 5)}$$

wherein Vz is the voltage across the idealized Zener diode; $I_1$ is the current feedback through resistances $R_1$, Rz and diode 16 as indicated in FIG. 1; and, Rz is the separately represented internal impedance of the idealized Zener diode 16. Also, current $I_1$ can be expressed mathematically as $$I_1=\frac{V_2-V_3}{R_1} \qquad \text{(Equation 6)}$$

Furthermore, Equation 5 can be transformed by use of the foregoing equations to read as follows:

$$G_2V_2-\frac{V_2}{G_1}=Vz+\frac{Rz}{R_1}(V_2-G_2V_2 \qquad \text{(Equation 7)}$$

Equation 7 can also be transformed to read as follows:

$$V_2\left(G_2-\frac{1}{G_1}\right)=Vz+V_2\left(\frac{Rz}{R_1}-\frac{Rz}{R_1}G_2\right) \qquad \text{(Equation 8)}$$

Further transformation of Equation 8 yields the expression $$Vz=V_2\left(G_2-\frac{1}{G_1}\right)-V_2\left(\frac{Rz}{R_1}-\frac{Rz}{R_1}G_2\right) \qquad \text{(Equation 9)}$$

Further transformation of Equation 9 yields the following expression:

$$V_2=\frac{Vz}{\frac{Rz}{R_1}(G_2-1)+G_2-\frac{1}{G_1}} \qquad \text{(Equation 10)}$$

Now, if $G_2$ is made close to unit; i.e., let $G_2\cong+1$, then Equation 10, above, can be expressed in the following form:

$$\frac{V_2}{Vz}=\frac{1}{1-\frac{1}{G_1}} \qquad \text{(Equation 11)}$$

Equation 10, supra, gives the output voltage $V_2$ as a function of the circuit parameters. As may be appreciated by inspecting Equations 10 and 11 if the gain $G_2$ is made close to unity the term containing Rz can be made very small and the effect of Zener resistance changes can be reduced. In a practical circuit $R_1$ is reduced to maintain the desired Zener current as $G_2$ approaches unity. This indicates that there will be an optimum value for $R_1$ and $G_2$ for a particular value of Zener voltage and output voltage.

In FIG. 2 there is shown graph of Equation 11; i.e., a plot of the ratio $V_2$ to Vz as a function of $G_1$. As indicated in the graph of FIG. 2 the output voltage $V_2$ may be set to any value within the power supply limits by the proper choice of $G_1$. From the graph of FIG. 2 it is noteworthy that if a negative output voltage $V_2$ is desired then $G_1$ is positive and less than unity.

The use of the Zener diode 16 in the feedback path of the first stage amplifier 10 greatly reduces the effect of offset voltages.

An offset voltage is a small voltage applied between the two input terminals of the operational amplifier to cause its output voltage to become zero. An operational amplifier is generally comprised of one or more stages of difference amplifiers. A difference amplifier has two inputs and one output. The output is a function of the difference in voltage between two input terminals. The positive input terminal is non-inverting. That is, a positive voltage excursion at the positive input terminal will cause the output voltage to swing in the positive direction. On the other hand, the negative, input terminal is inverting. This means that a positive voltage at this negative input terminal will result in a negative excursion at the output terminal of the operational amplifier. Since the output voltage is a function of the difference between the two input terminal voltages, if both inputs are at the same voltage the output should be at that same voltage. In a practical device, however, the two input voltages are never exactly balanced and the output voltage will not be at zero. Hence a small voltage applied between the two input terminals will cause the output voltage to become zero. The input voltage necessary to zero the output voltage is called the offset voltage. This offset voltage tends to be a function of temperature and is one of the primary causes of error in operational amplifiers.

Moreover, the basic advantages of the circuit configuration shown in FIG. 1 are derived from the use of nearly 100 percent feedback to stabilize all gains and the extremely constant current through the Zener diode 16 to stabilize the Zener voltage. While the Zener current is influenced by any drift in the output voltage and drift in the offset voltages of the amplifiers the effect of these drifts in the Zener current is much less than in most other voltage regulators. The result of more stable gain and Zener voltage is improved stability in the output voltage. Also, good rejection of power supply variations is achieved by connecting all circuit components through one of the multiple feedback loops.

In FIG. 3 there is illustrated a practical working embodiment of the voltage regulator according to the invention. As shown two operational amplifiers 10 and 12 are employed; the former being the first stage amplifier and the latter being the second stage amplifier. The output of amplifier 10 is directly connected to the base electrode of a NPN transistor Q1. The collector electrode of transistor Q1 is connected to the negative terminal 46 of a separate bias voltage source. A resistor 20 is connected in series between the emitter electrode of transistor Q1 and a negative input terminal of the second stage amplifier 12. Also, as shown, a Zener diode 16 is connected between the emitter electrode of transistor Q1 and a negative input terminal of the first stage amplifier 10. The Zener diode 16 is connected in the circuit configuration in accordance with the polarity shown in FIG. 3; i.e., its anode is connected to the emitter electrode of transistor Q1 while its cathode is connected to a negative input terminal of the first stage amplifier 10. Connected in series between a positive input terminal of the amplifier 10 and a common reference point, or ground, 14 is a resistor 24.

The output of the second stage amplifier 12 is directly connected to the base electrode of an NPN transistor Q2. Also, the output of the amplifier 12 is coupled by means of a capacitor 42 with a negative input terminal of the amplifier 12. Connected in series between the collector electrode of transistor Q2 and the positive terminal 48 of a source of bias voltage is a resistor 44. In the manner shown in FIG. 3 the emitter electrode of transistor Q2 is connected to the base electrode of another NPN transistor Q3 and to one end of a resistor 28; the other end of resistor 28 being connected to the common reference point or ground 14. The regulated output voltage designated as $V_2$ in FIG. 3 is derived from the emitter electrode of the transistor Q3. As shown, a resistor 30 connects the emitter electrode of the transistor Q3 with the collector electrode thereof and the collector electrodes of the transistors Q2 and Q3 are directly connected by means of a conductor element 50. Connected in series between the positive input terminal of the amplifier 12 and the common reference point or ground 14 is a resistor 26.

Serially connected between the output voltage $V_2$ and the negative input terminal of the first stage amplifier 10 as well as the cathode of the Zener diode 16 is a resistor 52. Also, as shown in FIG. 3 two serially connected resistor elements 32 and 34 are connected to one side of the capacitor 42 and to a junction point 54. Resistance element 34, is, as shown, a variable one whereas the resistance element 32 is a fixed resistor.

The output voltage $V_2$ is connected by means of a series resistor 22 to a junction point 18 which, as shown, is located between the positive input terminal of the amplifier 10 and the resistor 24. Also, a capacitor 40 is connected in series between the ground point 14 and the output voltage $V_2$ at a junction point 56.

Each amplifier 10 and 12 includes a potentiometer 36 and 38, respectively, for adjusting the DC level of the amplifier and, as shown, each potentiometer is connected to the positive terminal 48 of a DC voltage source.

Figure 4:
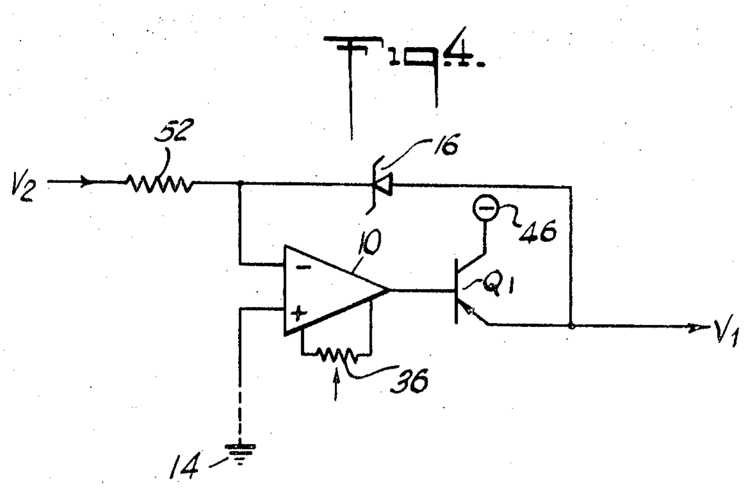
FIG. 4 is a schematic diagram of a part of the circuitry shown in FIG. 3 and serves to facilitate an explanation of the operation of the voltage regulator of the invention.

FIGS. 4 and 5 are somewhat simplified schematic diagrams of the first and second sections of the voltage regulator schematically illustrated in FIG. 3. The first section including the first stage operational amplifier 10 is shown in FIG. 4 whereas the second section including the second stage operational amplifier 12 and associated circuitry is shown in FIG. 5. For purposes of explanation, it is assumed that the positive input terminal of amplifier 10 in FIG. 4 is tied to ground 14 rather than to the junction 18 of resistors 22 and 24 as in FIG. 3. The first circuit section shown at FIG. 4 provides a constant current through Zener diode 16 and therefore stabilizes the voltage appearing across the Zener diode. According to operational amplifier theory the current through Zener diode 16 is the same as the current through the resistor 52. For all practical purposes the voltage appearing at the negative input terminal of the first stage operational amplifier 10 is the same as the voltage at the positive input terminal thereof. In this case, the voltage will be zero volt. The voltage appearing across the resistor 52 is the stable output voltage $V_2$. This constant voltage across a fixed resistor results in a constant current flow through the Zener diode 16. Constant current flow through the Zener diode 16 results in a very stable voltage appearing across the diode. In this case, the voltage is $V_1$. Any variations which might occur in the voltage $V_1$ are reduced by the product of the open loop gain of the amplifier 10 and the ratio of resistor 52 divided by $R_Z$ (Zener diode impedance). In the circuit shown at FIG. 3 this reduction was approximately $5 \times 10^5$.

The function of the transistor Q1 is to serve as an emitter follower to provide power gain for the amplifier 10. The potentiometer 36 is a balancing device for the amplifier 10.

The second section of the FIG. 3 circuit is shown in FIG. 5. This section (FIG. 5) forms a simple inverting amplifier with precision gain and input impedance and considerable driving power. The output impedance is zero until the output stage saturates. The gain $G_1$ is given by the ratio of the sum of resistances 34 and 32 divided by resistance 20, which gain is as stable as the resistors employed. The potentiometer 34 provides gain adjustment to set the final output voltage $V_2$. The output voltage $V_2$ is the product of the gain of this stage and the input voltage $V_1$.

Assume now that both sections, FIGS. 4 and 5, are connected together to form the voltage regulator circuit with the positive input terminal of amplifier 10 still connected to the common point 14. Since the voltage $V_1$ is a very stable voltage developed by amplifier 10 in the first section and the gain $G_1$ is precision the output voltage $V_2$ is a precise stable voltage. By connecting the output voltage $V_2$ back to the positive input terminal of the amplifier 10 through the resistive divider formed by the resistors 22 and 24 (FIG. 3) negative feedback is achieved around the entire loop. This results in improved stability in the regulation of the output voltage. In an ideal case the gain $G_2$, which is the ratio of resistance 24 divided by the sum of resistances 22 and 24, should approach unity to obtain maximum feedback and stability. However, the voltage across the resistor 22 in FIG. 3 is the same as the voltage across the resistor 52. Therefore, resistor 52 must approach zero as the gain $G_2$ approaches unity. This is necessary to provide sufficient current for the Zener diode 16. In a practical case the gain $G_2$ can be made close to 0.95 to achieve 95% feedback. The choice of Zener diode and the desired output voltage effects the selection of the resistor ratios.

The transistors Q2 and Q3 form cascaded emitter followers to provide greater output power. The resistor 44 provides short circuit protection for the transistor Q3. Normal operation however, does not require the use of resistor 44. The voltage regulator actually has two stable states since the Zener diode 16 will conduct in either direction. When power is first turned on the resistor 30 acts to insure that stabilization occurs in the proper state. The resistor 30 plays no part once the circuit is operating. The resistor 26 is used to present the same impedance to both the positive and negative input terminals of the operational amplifier 12. Although this is not essential to the operation improved temperature stability results if the amplifier 12 is constructed from transistors. The capacitor 40 shown in FIG. 3 is used to reduce transients on the output if the voltage regulator is used to drive a high frequency switching device such as for example an analog-to-digital converter. Also, the capacitor 42 is used to cause the gain of the amplifier 12 to roll off at higher frequencies and prevent oscillations. The need for capacitor 42 depends on the particular type of amplifier unit used for the second stage amplifier 12.

The circuit configuration shown in FIG. 3 was assembled and tested and operated successfully in achieving the objects of the invention, hereinbefore stated. One successful embodiment employed the following components which are to be considered as illustrative, not limitive, of the invention:

| | Component | Rating/Type |
|---|---|---|
| Fig. 3 Ref. No.: | | |
| 52 | Resistor | 51.1 ohms. |
| 34 | Variable resistor | 500 ohms (max.). |
| 32 | Resistor | 1.96 kilo ohms. |
| 20 | do | 2.05 kilo ohms. |
| 44 | do | 10 ohms. |
| 30 | do | 2.25 ohms. |
| 28 | do | 10 kilo ohms. |
| 22 | do | 5.62 ohms. |
| 24 | do | 511 ohms. |
| 26 | do | 1 kilo ohms. |
| 36 | Potentiometer | 50 kilo ohms. |
| 38 | do | 50 kilo ohms. |
| 40 | Capacitor | 47 microfarads. |
| 42 | do | 390 picofarads. |
| Q1 | Transistor | Type 2N727. |
| Q2 | do | Type 2N930. |
| Q3 | do | Type 2N656. |
| 48 | Positive d.c. source | +12 volts. |
| 46 | Negative d.c. source | −12 volts. |
| 16 | Zener diode | Type 1N939 (9 volts). |

Also, the operational amplifiers 10 and 13 are type CIA–1 manufactured by Nexus Research Labs. Inc. of Canton, Mass. An output voltage $V_2$ of +5.12 volts was provided.

What is claimed is:

1. A voltage regulator circuit comprising: a first operational amplifier having an output terminal for delivering a first voltage and positive and negative input terminals; a second operational amplifier having an output terminal for delivering a second voltage and positive and negative input terminals, first impedance means connected between the second amplifier's output terminal and the negative input terminal of the first amplifier; second impedance means connected between the first amplifier's output terminal and the second amplifier's negative input terminal; third impedance means connected between the second amplifier's output and negative input terminals; signal ground means; means connecting the second operational amplifier's positive input terminal to the signal ground means; series-connected fourth and fifth impedance means connected between the second amplifier's output terminal and the signal ground means; means connecting the first amplifier's positive input terminal to a junction between the series connected fourth and fifth impedance means; and, means connected between the output terminal of the first amplifier and the negative input terminal thereof for stabilizing the voltage across said first amplifier.

2. The voltage regulator circuit according to claim 1 wherein the last-mentioned voltage stabilizing means is a Zener diode.

3. The voltage regulator circuit according to claim 2 wherein said Zener diode includes an anode and cathode, the cathode being connected to the first amplifier's negative input terminal and the anode being connected to the first amplifier's output terminal.

4. The voltage regulator circuit according to claim 2 wherein said first, second, third, fourth and fifth impedance means are resistance elements, and wherein said second voltage at the output terminal of the second operational amplifier is defined by the equation $$V_2=\frac{Vz}{\frac{Rz}{R_1}\,(G_2-1)+G_2-\frac{1}{G_1}}$$

wherein $V_2$ is the second voltage; Vz is the voltage across the Zener diode; Rz is the resistance of the Zener diode; $R_1$ is the resistance of the first impedance means and $G_1$ and $G_2$ are defined as follows:

$$G_1=-\frac{R_3}{R_2}$$

and $$G_2=\frac{R_5}{R_4+R_5}$$

wherein $R_2$, $R_3$, $R_4$ and $R_5$ are the resistances of the second, third, fourth and fifth impedance means.

5. The voltage regulator circuit according to claim 4 wherein $G_2$ is made to approach +1 so that the following relationship obtains $$\frac{V_2}{Vz}=\frac{1}{1-\frac{1}{G_1}}$$

6. The voltage regulator according to claim 2 wherein substantially constant current is maintained through the Zener diode.

7. The voltage regulator circuit according to claim 2 further comprising first means intermediate the first amplifier's output terminal and the second impedance means for providing power gain for the output of the first amplifier and second means connected to the second amplifier's output terminal for providing power gain for the second amplifier.

8. The voltage regulator circuit according to claim 7 wherein said first means is comprised of a transistor connected in an emitter-follower configuration.

9. The voltage regulator circuit according to claim 7 wherein said second means is comprised of cascaded emitter follower connected transistors.

References Cited

UNITED STATES PATENTS

| | | | |
|---|---|---|---|
| 2,281,238 | 4/1942 | Greenwood | 330—99 |
| 2,516,865 | 8/1950 | Ginzton | 330—200 |
| 3,133,242 | 5/1964 | Harries. | |

JOHN F. COUCH, Primary Examiner

A. D. PELLINEN, Assistant Examiner

U.S. Cl. X.R.

330—103